United States Patent

[11] 3,586,824

| [72] | Inventor | Edward A. Barney<br>841 E. 117th St., Los Angeles, Calif. 90059 |
|---|---|---|
| [21] | Appl. No. | 860,867 |
| [22] | Filed | Sept. 25, 1969 |
| [45] | Patented | June 22, 1971 |

[54] ELECTRIC HEATING APPLIANCE
5 Claims, 4 Drawing Figs.

[52] U.S. Cl. .................................................. 219/452,
219/435, 219/464, 219/518
[51] Int. Cl. .................................................. H05b 3/68
[50] Field of Search ................................. 219/464,
446—5, 452, 5—6, 432, 441, 2—4, 451, 435—6,
518, 509

[56] References Cited
UNITED STATES PATENTS

| 2,888,548 | 5/1959 | Knapp | 219/435 |
| 1,157,731 | 10/1915 | Sprenger | 219/452 |
| 2,250,966 | 7/1941 | Propernick et al. | 219/452 X |
| 2,678,991 | 5/1954 | Amfitheatrof | 219/455 X |
| 2,715,176 | 8/1955 | Schoberle | 219/452 X |
| 2,863,010 | 12/1958 | Riedl | 200/6 X |
| 3,025,383 | 3/1962 | Forsness, Jr. | 219/432 X |
| 3,134,007 | 5/1964 | Niblo | 219/452 |

FOREIGN PATENTS

| 518,738 | 11/1955 | Canada | 219/435 |
| 600,300 | 11/1925 | France | 219/436 |
| 262,510 | 10/1949 | Switzerland | 219/452 |

*Primary Examiner*—Volodymyr Y. Mayewsky
*Attorney*—Nilsson, Robbins, Wills and Berliner ABSTRACT: An electric heating appliance in which a plate adapted to support a food bearing article is disposed over a heating element so as to move downwardly toward the element when the article is placed thereon, and moves upwardly away from the element when the article is removed. Switching means are provided whereby the heating element is energized upon downward movement of the plate and deenergized upon upward movement of the plate.

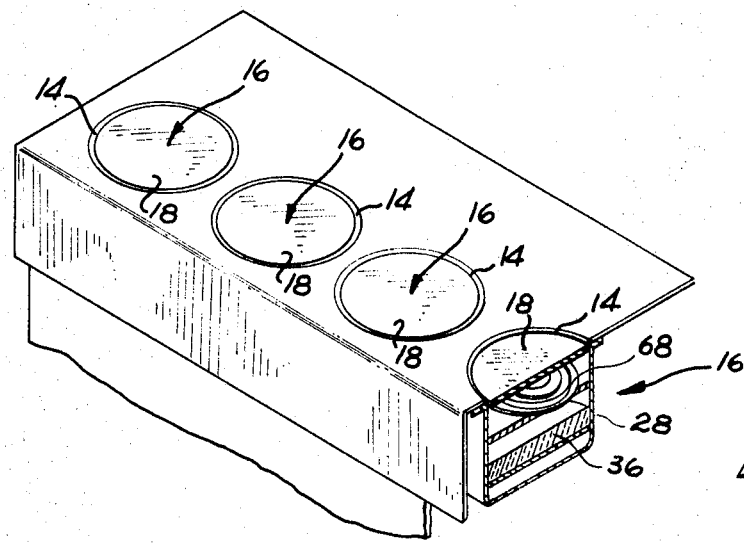
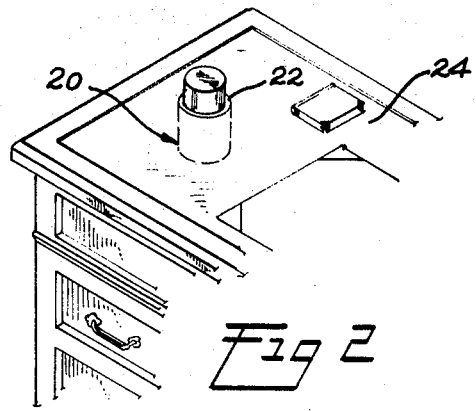
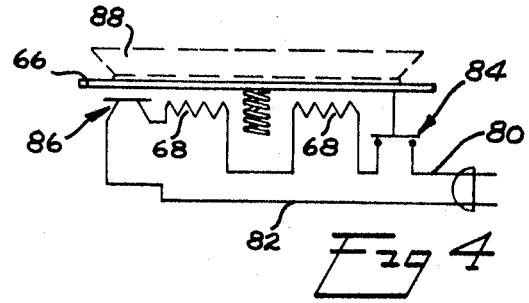
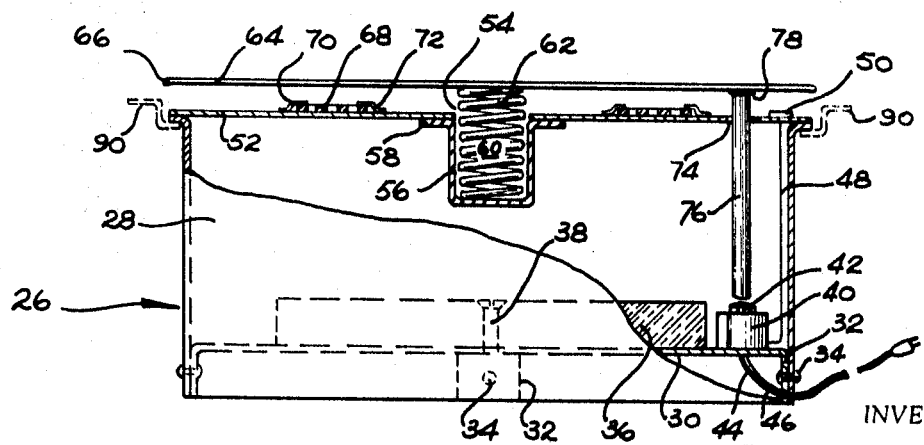

ELECTRIC HEATING APPLIANCE

BACKGROUND OF THE INVENTION

1. Field of the Invention

The field of art to which the invention pertains includes the field of electrical heaters.

2. Description of the Prior Art

In the serving of food in restaurants, the waitress is often serving a large number of patrons simultaneously and for this or other reason may leave a large number of prepared plates in the kitchen area for a period of time sufficient to cool the food, resulting in poor service. To alleviate this problem, restaurants often employ banks of infrared lamps at a waiting station where prepared plates yet to be picked up can be heated and kept hot. However, these lamps generally are not sufficient to adequately protect the food against cooling. Further, in restaurants where there are large air currents, such as open air restaurants, the food may rapidly cool after being served. It would be desirable to provide means for keeping food warm during such periods of waiting and/or while the food is being eaten so as to thereby insure enjoyment of a hot meal.

In a related area of food service, a businessman often drinks coffee, tea, or other such food beverage, at his desk, and the beverage, whether in a paper of ceramic cup, often cools before being fully consumed. It would be desirable to maintain such beverages in a warm condition during the time that the beverage remains on the desk so that full enjoyment thereof can be obtained.

SUMMARY OF THE INVENTION

The present invention provides an appliance for keeping food bearing articles warm. The appliance has a surface which is electrically heated when such an article is placed thereon, but which immediately looses its heat when the article is removed so that the region above the appliance rapidly returns to ambient temperature to permit normal use of the adjacent space. In accordance herewith, I provide an electric heating appliance including a plate adapted to support a food bearing article, a heating element, means for supporting the plate over the heating element for movement of the plate upwardly and downwardly with respect to the heating element, and means for electrically energizing the heating element when the plate is in a downward position. Importantly, when a food bearing article is placed on the plate, the weight thereof causes the plate to move downwardly toward the heating element. When the food bearing article is removed, the plate moves upwardly, away from the heating element so as to rapidly lose its heat. Simultaneously, the heating element is deenergized.

In particular embodiments, the electrically energizing means comprises normally open electrical contacts and a member movable vertically to close the contacts under actuation of an article placed on the plate. This member can be secured to the underside of the plate to move downwardly and upwardly therewith, so that when the plate is in an upward position, the contacts are open to deenergize the heating element. In further particular embodiment, the supporting means comprises a spring normally biasing the plate upwardly and positioned centrally of the plate, the heating element being flat and formed about the spring. The spring is disposed in the top wall of a housing which includes insulating means to protect underlying structures. A thermostatic control is provided for the heating element to deenergize the heating element when at a preselected temperature.

BRIEF DESCRIPTION OF THE DRAWINGS

FIG. 1 is a schematic perspective view of a portion of a restaurant counter top in which are embedded a plurality of heating appliances of this invention;

FIG. 2 is a schematic perspective view of a portion of a desk top in which an appliance of this invention is embedded;

FIG. 3 is a partially broken, partially cross sectional side view of an appliance of this invention; and FIG. 4 is a circuit diagram of the invention as shown in FIG. 3.

DETAILED DESCRIPTION

Referring to FIG. 1, there is schematically illustrated a restaurant counter top having a level surface 12. The surface 12 defines a plurality of apertures 14 for reception therein of appliances 16 of this invention, as hereinafter described. Each of the appliances 16 in FIG. 1 are identical and includes a circular top plate 18 disposed so that its top surface is flush with the counter top surface 12. It will be appreciated that such a plurality of appliances could be disposed through the surface of a square, round, or any shape table utilized in a restaurant, or in a home. Further, although the plates 18 are shown as circular member, they may be formed square, or may have any other shape, the apertures 14 being formed with corresponding contours. The plates 18 fit sufficiently close within the apertures 14 so as to prevent utensils from falling therebetween, but are sufficiently spaced from the counter top surface so as to freely move downwardly therefrom.

Referring to FIG. 2, the appliance (shown in shadow by numeral 20) is provided in this embodiment in a much smaller form for utilization within a smaller aperture 22 defined through the surface of a desk top 24. However, in other respects, the appliance 20 is identical to the appliance 16 depicted in FIG. 1. In this embodiment, the appliance 20 is utilized to heat a ceramic or paper cup of coffee, tea or other food beverage, so as to maintain the contents thereof in a warm condition.

Referring to FIG. 3, an appliance 26 constructed in accordance with the invention herein is shown and which is identical in manner of construction with the appliances 16 and 20 depicted in FIGS. 1 and 2, respectively. The appliance includes a housing 28 in the form of a hollow cylinder and which encloses a circular platform 30. The platform 30 is spaced from the bottom of the cylinder by means of bracket flanges 32 which are riveted, as at 34, to the bottom portion of the housing 28. The platform 30 supports heat insulating material which can be in the form of a ceramic disc 36 or may be asbestos or other material, secured centrally thereof to the platform 30 by means of a screw (shown in shadow at 38). A switch, shown schematically at 40, is secured to the platform 30 on one side thereof and is of the type wherein downward pressure on its actuating button 42 serves to close contact between electrical leads 44 and 46 thereto, and release of pressure on the button 42 effects the release of such contact to open the switch. As shown, the switch 40 is in an open position and is connected via leads, shown schematically at 48, to a thermocouple, shown schematically at 50. The thermocouple is connected to the switch so as to open the switch when subjected to heat beyond a preselected temperature.

A cover 52 is provided for the housing and is formed with a central aperture 54 therethrough. A cup member 56 is provided disposed beneath the aperture 54 and has a lip 58 which is secured as by welding to the underside of the cover 52 so as to provide a recess compartment 60. A spring 62 is placed within the recess compartment 60 and is secured to the underside of a metallic circular plate 64. The spring 62 is sufficiently strong so that when it is disposed within the compartment 60 it supports the plate 64 spaced from the housing cover 52. However, the spring is chosen so as to not withstand the weight of a food bearing article, such as a china plate, or a partially filled paper cup, or the like, depending upon the particular application for the appliance. The outer edge of the plate 64 can be formed with a downwardly depending lip 66 extending slightly outwardly of the housing 28 and cover 52 so that any spillage thereon is diverted away from the cover 52.

A spirally formed flat heating coil 68 is secured by brackets 70 and 72 to the top cover 52 and connected via leads (not shown) to the switch 40. The heating coil 68 is disposed about the spring 52 and is spaced from the top plate 64, when the plate is in its upward position. It is very important to the operation of this invention that the heating coil 68 be disposed in such a manner that when a food bearing article is placed atop the plate 66, the plate 66 is depressed downwardly toward the heating coil 68, and when the article is removed from the plate 66, it moves upwardly away from the heating coil 68 so as to enable rapid cooling thereof.

The housing cover 52 is provided with an additional aperture 74 on one side thereof through which is disposed a downwardly depending, rodlike member 76, which member is affixed to the underside of the plate at 78 as by welding thereof. The member 76 extends into the housing 28 and terminates immediately above the switch button 42 in such a position as to depress the switch button 42 when the plate 66 is moved downwardly toward the heating coil 68. By such means, the heating coil 68 is energized when the plate 66 moves downwardly and is deenergized when the plate 66 moves upwardly so as to effect rapid heating and rapid cooling, respectively.

Referring to FIG. 4, there is diagrammatically illustrated a typical electrical circuit for effecting regulated energization and deenergization of the heating element 68. The heating element 68 is shown as a resistance coil connected by means of suitable conducting leads 80 and 82 to a source current. The switch components 40 and 42 and downwardly depending member 76 (FIG. 3) are shown as a contact switch 84. The thermocouple 50 is shown at 86 and is constructed so as to interrupt the circuitry when open by being subjected to heat beyond a preselected temperature in accordance with the particular use to which the appliance is to be put. When a food bearing article, such as shown at 88 in shadow, is placed atop the plate 66, it causes the normally open switch 84 to close to thereby energize the coils 68, as described above.

Brackets (shown in shadow at 90 in FIG. 3) can be utilized to secure the appliance to the underside of a table top. Alternatively, the appliance can be placed atop a table, in which case an aperture therefor need not be provided, but greater advantages of convenience of use are obtained when the appliance is placed so that its top plate 64 is flush with the table or countertop surface.

I claim:
1. An electric heating appliance comprising:
   a plate constituting an upper surface of said appliance and adapted to support a food bearing article to be heated;
   a heating element underlying said plate;
   means for supporting said plate over said heating element for movement of said plate upwardly and downwardly with respect to said heating element;
   means for electrically energizing said heating element when said plate is in a downward position; a housing having a top wall, said heating element being secured on said top wall;
   an aperture in said top wall beneath said plate;
   a member secured beneath said aperture and spaced from the plane of said top wall;
   said supporting means comprising a spring supported by said member;
   insulating means within said housing; and said electrically energizing means comprising normally open electrical contacts and a switch member movable vertically to close said contacts under actuation of an article placed on said plate.
2. The invention according to claim 1 wherein said switch member is secured to the underside of said plate to move downwardly therewith.
3. The invention according to claim 1 wherein said spring is positioned centrally of said plate, and said heating element is a flat member disposed about said spring.
4. The invention according to claim 1 including a thermostatic control for said heating element to deenergize said element when heated to a preselected temperature.
5. The invention according to claim 1 including:
   a table top;
   an aperture in said table top for said plate; and
   said spring securing said plate in the aperture of said table top substantially on a plane with the top surface of said table top when said heating element is deenergized.